US011787322B2

(12) United States Patent
Turletti (10) Patent No.: US 11,787,322 B2
(45) Date of Patent: Oct. 17, 2023

(54) TABLE UNIT FOR A MOTOR-VEHICLE SEAT; MOTOR-VEHICLE SEAT PROVIDED WITH THIS UNIT AND MOTOR-VEHICLE INCLUDING THIS SEAT

(71) Applicant: ISRINGHAUSEN S.p.A., San Pietro Mosezzo (IT)

(72) Inventor: Massimo Turletti, San Pietro Mosezzo (IT)

(73) Assignee: ISRINGHAUSEN S.P.A., San Pietro Mosezzo (IT)

( * ) Notice: Subject to any disclaimer, the term of this patent is extended or adjusted under 35 U.S.C. 154(b) by 91 days.

(21) Appl. No.: 17/490,313

(22) Filed: Sep. 30, 2021

(65) Prior Publication Data
US 2022/0105850 A1    Apr. 7, 2022

(30) Foreign Application Priority Data
Oct. 6, 2020    (IT) .......................... 102020000023500

(51) Int. Cl.
*B60N 3/00* (2006.01)
(52) U.S. Cl.
CPC .................................... *B60N 3/004* (2013.01)
(58) Field of Classification Search
CPC ........ B60N 3/004; B60N 3/001; B60N 3/002; B60N 2/366; B60N 2/36; B60N 2/32; B60N 2/24
USPC ......................................................... 297/146
See application file for complete search history.

(56) References Cited

U.S. PATENT DOCUMENTS

| 6,220,660 | B1 | 4/2001 | Bedro et al. |
| 6,598,934 | B1* | 7/2003 | Anderson .............. B60N 3/002 297/145 |
| 8,789,881 | B2* | 7/2014 | von Rothkirch Und Panthen ...... B60N 2/77 297/411.32 |
| 10,836,322 | B2* | 11/2020 | Suzuki ...................... B60R 7/04 |
| 10,906,446 | B2* | 2/2021 | Gaines ................... B60N 3/002 |
| 11,529,896 | B2* | 12/2022 | Fitzpatrick ............... B60N 2/36 |
| 2003/0122392 | A1* | 7/2003 | Larsen ................... B60N 2/793 296/37.8 |
| 2010/0244502 | A1* | 9/2010 | Andersson ............... B60N 2/79 297/118 |
| 2012/0104822 | A1* | 5/2012 | Henke .................... B60N 2/757 297/411.32 |
| 2014/0319867 | A1 | 10/2014 | von Rothkirch Und Panthen et al. |

* cited by examiner

FOREIGN PATENT DOCUMENTS

| DE | 4343242 A1 | 6/1995 |
| DE | 20020072 U1 | 4/2002 |

OTHER PUBLICATIONS

Italian Search Report dated Jun. 15, 2021.

*Primary Examiner* — Mark R Wendell
(74) *Attorney, Agent, or Firm* — Heslin Rothenberg Farley & Mesiti P.C.; Victor A. Cardona, Esq.

(57) ABSTRACT

A table unit for a motor-vehicle seat comprises a base plate connected in an articulated manner to a backrest frame of the seat, in such a way as to be movable between an inoperative position, adjacent to a front surface of the seat backrest and an operative position, projecting horizontally in a cantilevered manner from the front surface of the backrest. A table is pivotally mounted on the base plate and is configured to rotate with respect to the base plate selectively about any one of two articulation axes parallel to, and spaced apart form, each other.

9 Claims, 12 Drawing Sheets

TABLE UNIT FOR A MOTOR-VEHICLE SEAT; MOTOR-VEHICLE SEAT PROVIDED WITH THIS UNIT AND MOTOR-VEHICLE INCLUDING THIS SEAT

CROSS REFERENCE TO RELATED APPLICATIONS

This application claims priority from Italian Patent Application No. 102020000023500 filed on Oct. 6, 2020, the entire disclosure of which is incorporated herein by reference.

FIELD OF THE INVENTION

The present invention relates to a table unit for a motor-vehicle seat, of the type comprising:

a base plate, configured for articulated connection to a support frame, in such a way as to be movable between an inoperative position, adjacent to a front surface of a seat backrest and an operative position, projecting horizontally in a cantilevered manner from said front surface of the seat backrest, and a table, pivotally mounted on the base plate.

PRIOR ART

A table unit for a motor-vehicle seat having the characteristics indicated above is described and illustrated, for example, in document US 2014/319867A1 and in DE 4 343 242 A1. The document DE 200 20 072 U1 illustrates a table that pivots with respect to a base plate around any one of two parallel and spaced apart articulation axes.

In general, the use of tables, in particular pivoting tables, in association with motor-vehicle seats has been known for some time. It is also known to envisage that the table can be moved between an inoperative position of minimum bulk and an operative position, in which it is useful, for example, for consuming a meal on board the motor-vehicle, or as a work surface and/or for supporting a laptop computer.

Object of the Invention

The object of the present invention is to provide a table unit of the type indicated at the beginning of the present description, which is configured in such a way as to render the use of the table unit extremely easy, both by a user who occupies a seat to the right of the table unit, and by a user occupying a seat placed to the left of the table unit.

In particular, one object of the present invention is to provide a table unit which, when it is in its operating condition, allows the pivoting table to be rotated, to the right or to the left, in a position that—in any case-allows easy use by the user.

Another object of the invention is that of achieving the aforesaid object with a table unit that has a structure of simple construction and of reliable and safe operation.

Another object of the invention is to provide a table unit wherein the pivoting table can preferably be positioned in several stable operating positions, rotated by different angles with respect to the base plate, ensuring—in all conditions—that the table is able to remain stable even with a weight applied on top of it.

SUMMARY OF THE INVENTION

In order to achieve one or more of the aforesaid objects, the invention relates to a table unit having the characteristics indicated at the beginning of the present description, and further characterized in that the pivoting table is configured to rotate with respect to the base plate selectively around any one of two mutually parallel and spaced apart articulation axes. The two aforesaid articulation axes are defined by two articulation pins carried by the base plate and arranged symmetrically on both sides of, and at a distance from, a longitudinal centerline of the base plate. The base plate is provided with two latching devices, arranged, respectively, for engaging said two articulation pins and having respective release buttons, in such a way that the actuation of one of the release buttons enables the base plate to be rotated around the articulation pin that is associated with the latching device that is still locked.

In this description the term "longitudinal" is used with reference to a direction which, in the assembled condition of the table unit on the motor-vehicle, is parallel to the longitudinal direction of the motor-vehicle.

According to another preferred characteristic, the two latching devices are operatively connected to each other by means of a connecting device configured in such a way that if one of the two latching devices is unlocked, said connecting device prevents unlocking of the other latching device.

Thanks to the aforesaid characteristics, the table unit according to the invention can achieve a number of important advantages.

Firstly, the provision of two articulation axes for the pivoting table allows, each time, the pivoting table to be brought into the most comfortable and suitable position to serve the user, depending on whether the table must be rotated to the right, to serve a user seated to the right of the table unit, or to the left, to serve a user seated to the left of the table unit. If the person who wants to use the table unit occupies the seat to the right of the table unit, he/she will be able to unlock the latching device associated with the left articulation pin, so as to allow rotation of the pivoting table around the right articulation pin. In this way, in the rotated position, the pivoting table will be displaced laterally towards the user, in front of him/her, so as to make it particularly easy to use. In the same way, when the person who wants to use the table unit occupies the seat to the left of the table unit, he/she will be able to unlock the latching device associated with the right articulation pin, so as to allow rotation of the pivoting table around the left articulation pin. In both cases, the rotation movement is manually imparted by the user.

Another advantage of the preferred embodiment derives from the use of the aforesaid connecting device which, once the release button of one of the two latching devices has been activated, prevents the other latching device—in turn—being released by acting on the respective release button. In this way, the use of the table unit in conditions of total safety is guaranteed, as accidental separation of the pivoting table from the base plate is avoided, in certain extreme conditions.

In a preferred embodiment, each latching device comprises:

a hooking lever pivotally mounted on the base plate and having a hooking portion configured to partially surround the respective articulation pin, a locking lever, pivotally mounted on the base plate and having a locking position, wherein it engages the hooking lever so as to lock the hooking lever in an engagement position of the respective articulation pin, a spring operatively interposed between the locking lever and the hooking lever, which tends to rotate the hooking lever away from its engagement position of the articulation pin, and which tends to keep the locking lever in its locking position, and a connecting transmission between the locking lever and the respective release button, configured in such a way that the actuation of the release button causes a movement of the locking lever away from its locking position, against the action of said spring and a resulting rotation of the hooking lever away from its engagement position, due to the action of said spring.

In the preferred embodiment, the two release buttons are arranged on the two sides of the base plate.

Furthermore, in the aforesaid preferred embodiment example, the connecting device, which prevents the release of a latching device when the other latching device has already been unlocked, comprises a rod having end portions with respective guide slots in each of which a respective auxiliary pin is engaged, carried by the hooking lever of the respective latching device, each guide slot being configured in such a way as to block the movement of the auxiliary pin of the respective hooking lever when the other hooking lever has been released.

According to another preferred characteristic, a positioning member is mounted underneath the pivoting table, said positioning member having a peripheral elastic track configured to slide against a central pin of said base plate during the rotation of the pivoting table with respect to the base plate, said peripheral elastic track of the positioning member being configured to define several stable positions of the pivoting table, corresponding to different rotation angles with respect to the base plate.

Furthermore, preferably, the table unit comprises a guide plate mounted below the pivoting table and below said positioning member, and having a guide slot which is engaged by the aforesaid central pin cooperating with the peripheral track of the positioning member.

Thanks to all the aforesaid preferred characteristics, the table unit according to the invention guarantees a reliable and safe operation, in all its operating conditions. In particular, the provision of the guide plate with the guide slot engaged by a central pin carried by the base plate ensures that the pivoting table stably maintains its horizontal position even when it is rotated into a position wherein it protrudes in a cantilevered manner from the base plate and also with a weight applied on top of it.

The invention also relates to a motor-vehicle seat equipped with the table unit described above, as well as a motor-vehicle equipped with this seat. Although the invention is of general application, in a specific embodiment it is applied to an assembly of two front passenger seats for a commercial vehicle. In this case, the table unit according to the invention may be applied to the passenger seat that is located in an intermediate position between the driver's seat and the other passenger seat. As indicated, however, the invention lends itself to being applied to a motor-vehicle of any type and in association with seats of any type (for example, to a rear central seat). The case is also not excluded wherein the support frame of the table unit is not a seat frame, but is instead a frame directly connected to the motor-vehicle structure

DETAILED DESCRIPTION OF A PREFERRED EMBODIMENT

Further characteristics and advantages of the invention will become apparent from the description that follows with reference to the attached drawings, provided purely by way of non-limiting example, wherein.

Figure 1:
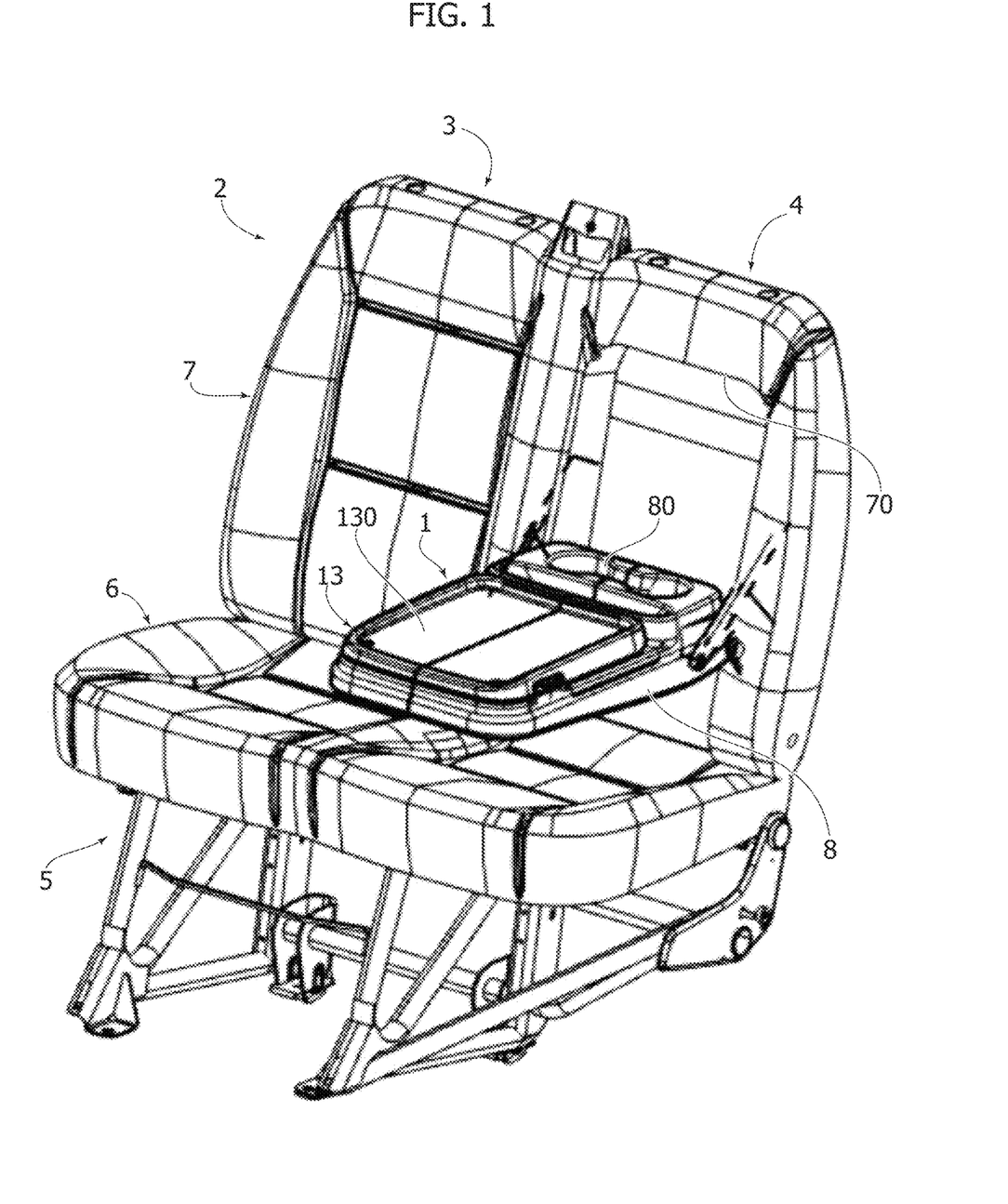
FIG. 1 is a perspective view of an assembly of two front passenger seats for a motor-vehicle, specifically a commercial (light duty) vehicle, provided with a table unit according to the invention, with the table unit in its lowered operating position and the pivoting table in the non-rotated position.

The application example illustrated in FIG. 1 refers to an assembly of front passenger seats for a motor-vehicle, specifically a commercial vehicle, a van or the like.

The reference number 1 indicates—in its entirety—the table unit according to the invention. The assembly of seats, indicated with 2, comprises a right side seat 3 and a seat 4 intended to be in an intermediate position between the right side seat 3 and the driving seat of the motor-vehicle (not shown).

The table unit 1 is intended to selectively serve the occupant of the right side seat 3 or the occupant of the driving seat located to the left of the central seat 4.

As already indicated above, this provision is illustrated by way of example only. In fact, the invention can be applied to a motor-vehicle of any type, and in association with seats of any type (for example, even a rear seat).

Figure 2:
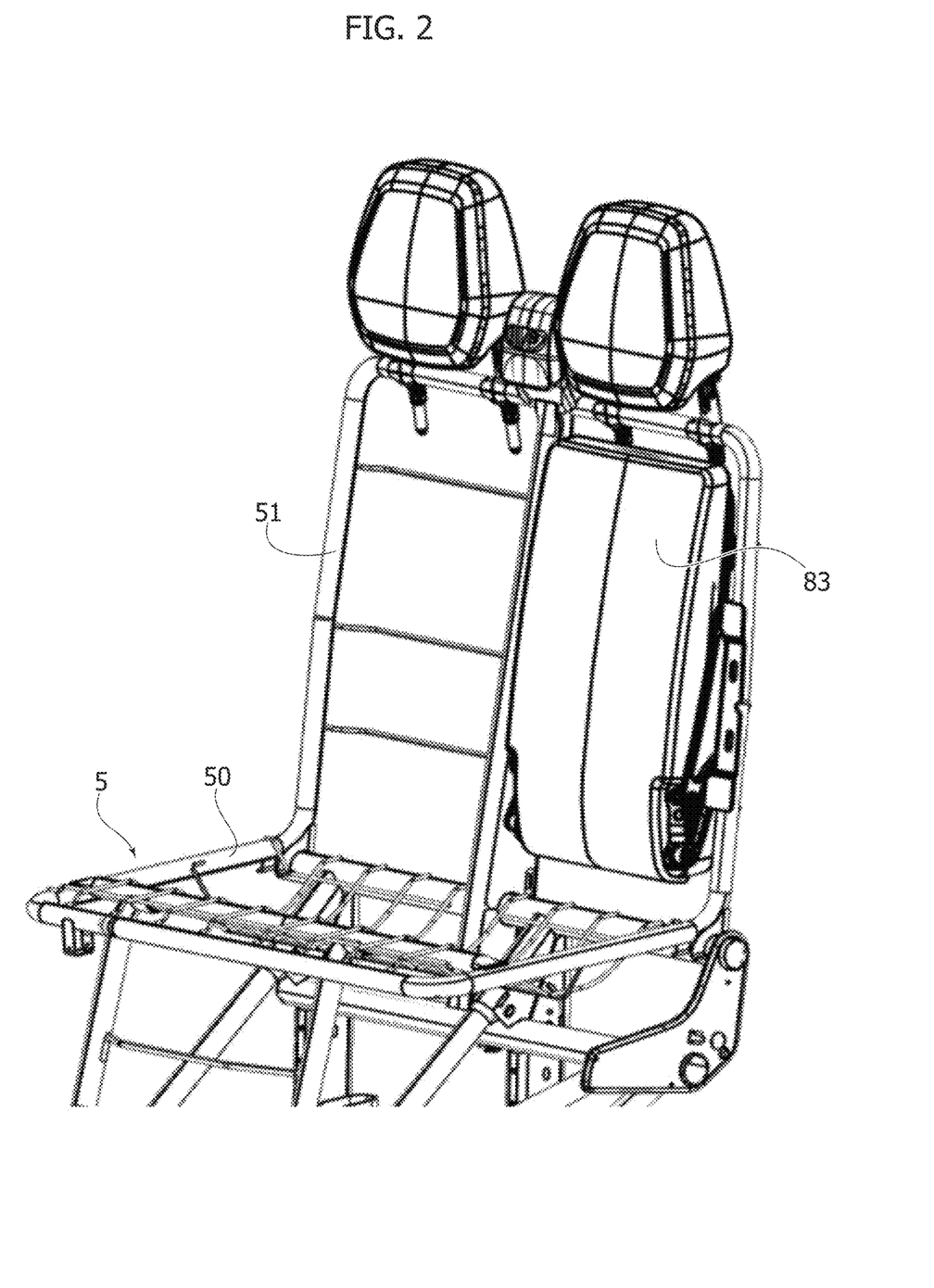
FIG. 2 is a partial perspective view of the frame of the front seat assembly of FIG. 1, with the table unit illustrated in its inoperative raised position.

With reference to FIG. 2, the assembly of seats 2 includes a frame 5 intended to be anchored to the floor of the motor-vehicle and including a cushion frame 50 and a backrest frame 51 on which the padded bodies of a cushion 6 and a backrest 7 are mounted.

Figure 6:
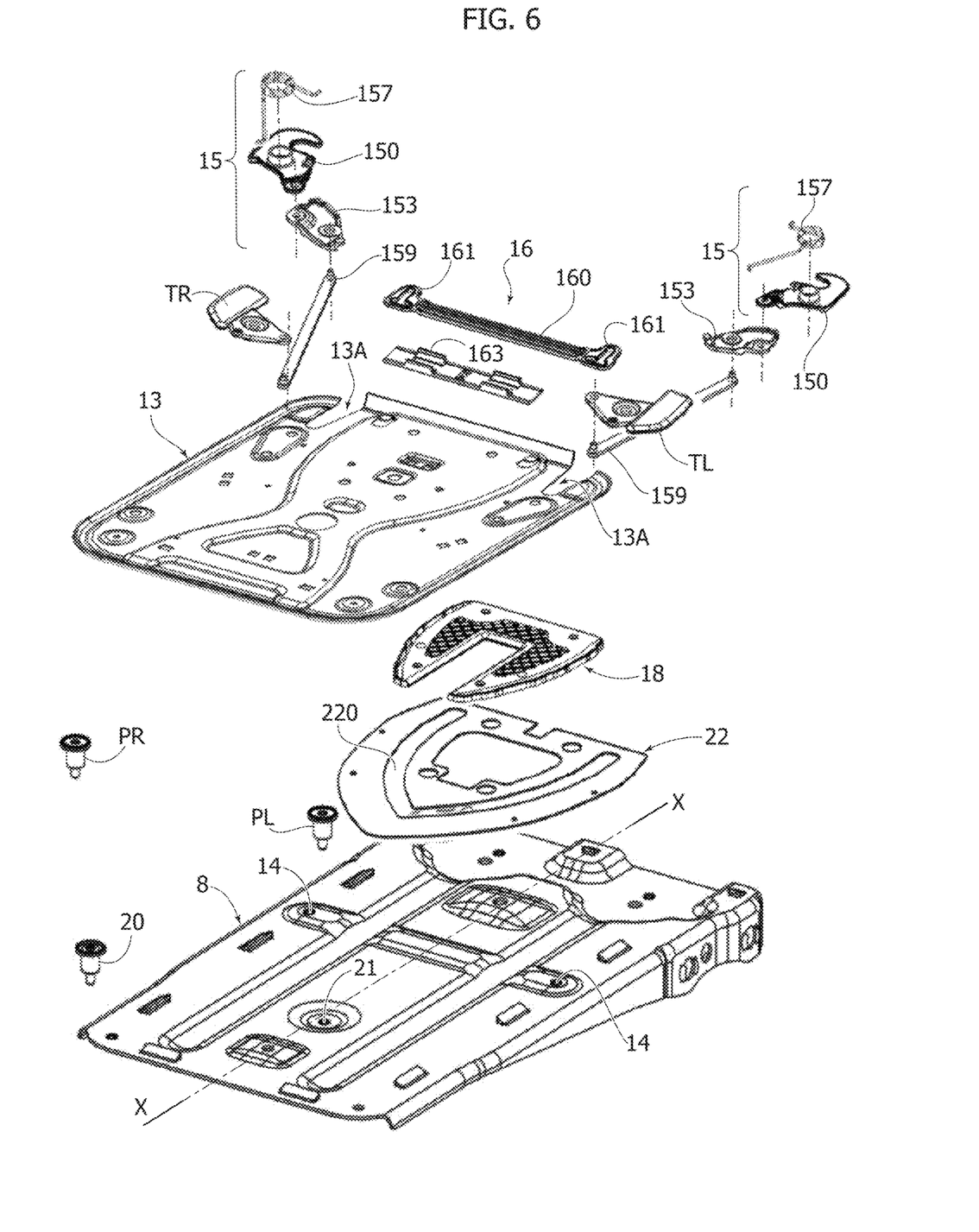
FIG. 6 is an exploded perspective view of the parts making up the table unit.

With reference also to FIG. 6, the structure of the table unit 1 includes a base plate 8, for example, of metal material, which is connected—in an articulated manner—to the frame 51 of the backrest 7 at the left-hand seat 4.

Figure 3:
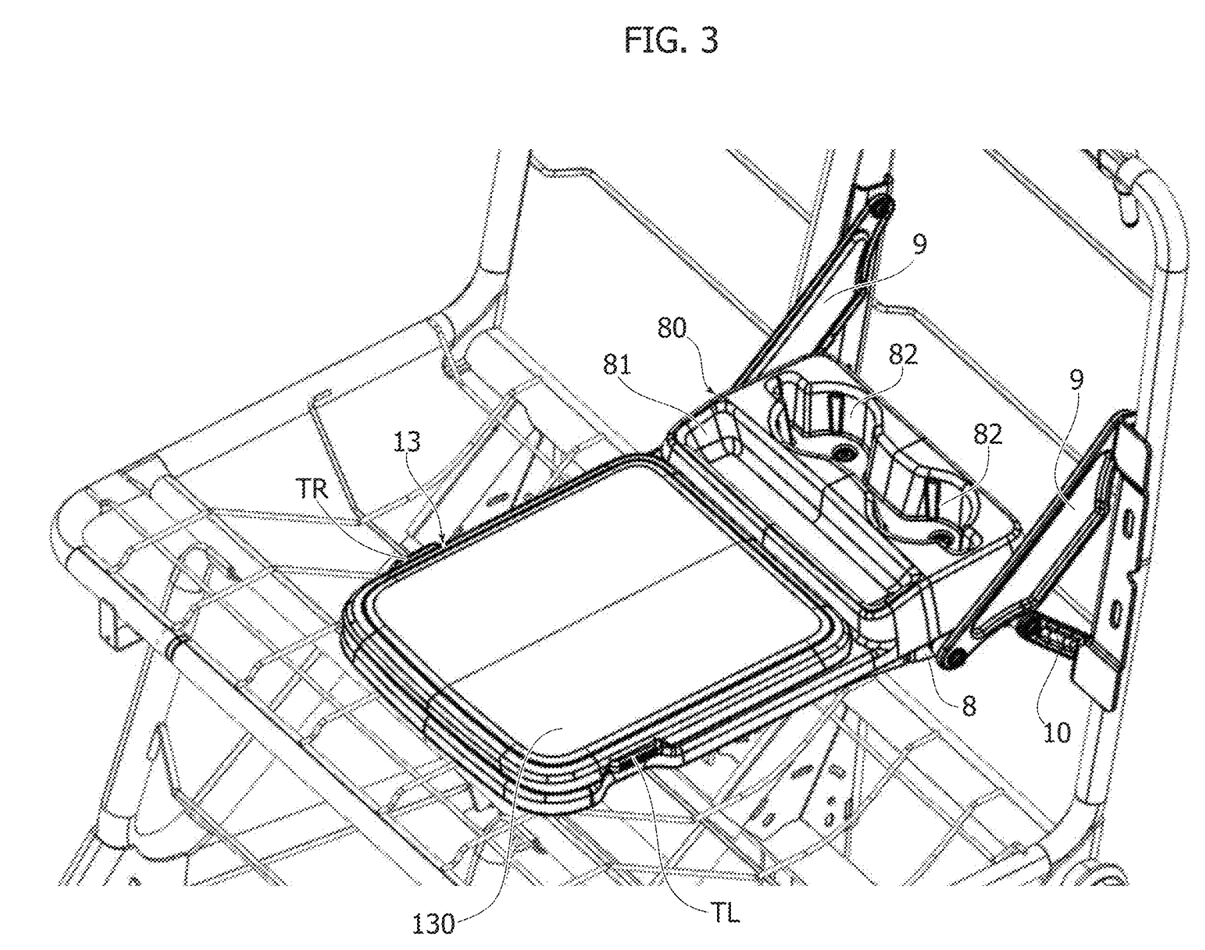
FIG. 3 is an additional perspective view, on an enlarged scale, of the frame of the seat assembly of FIG. 2, with the table unit illustrated in its lowered operating position.
Figure 4:
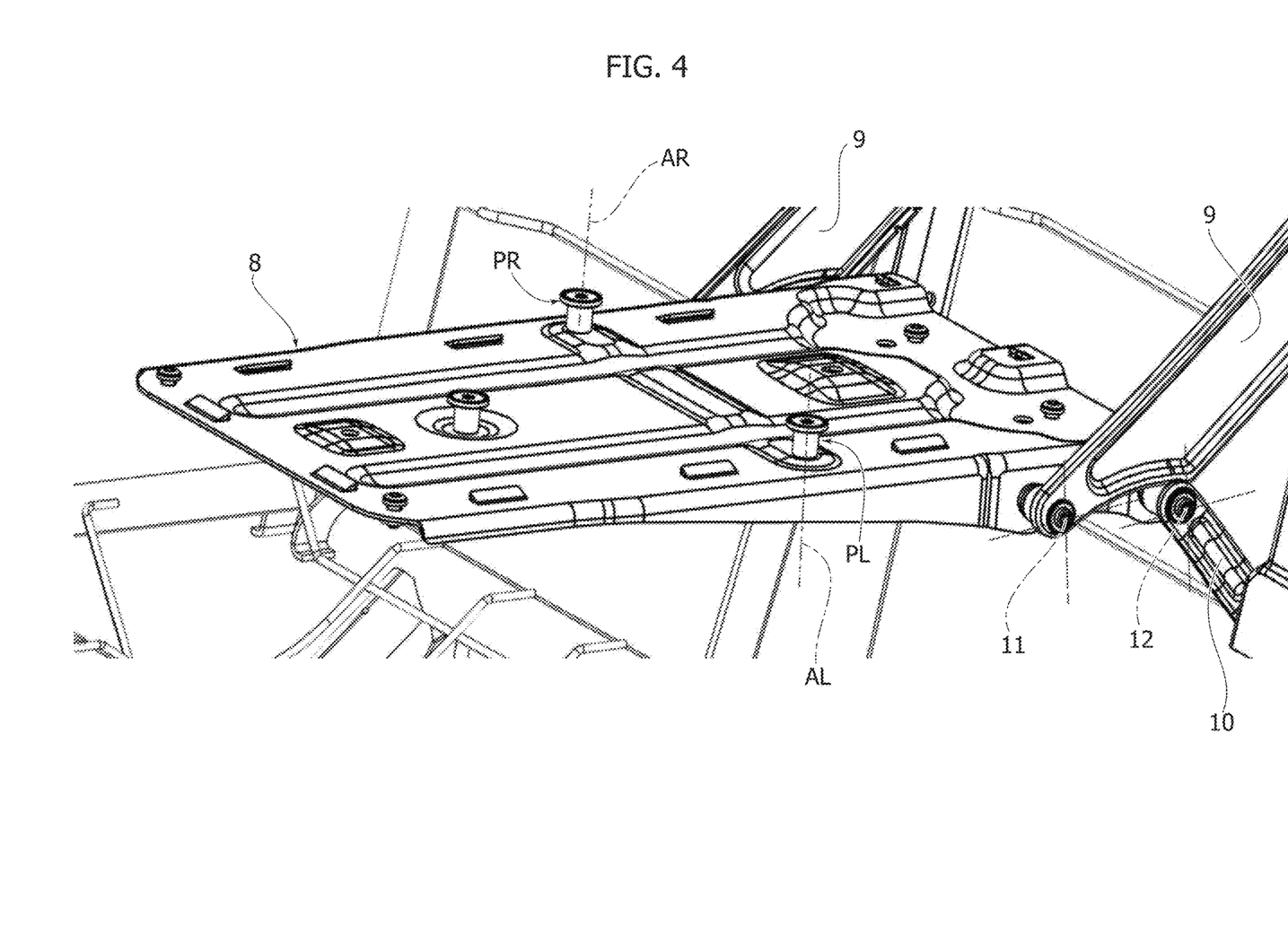
FIG. 4 is a perspective view of the base plate forming part of the table unit according to the invention, shown in its lowered operating position.

As can be seen in FIG. 4 (which illustrates only the base plate 8), the articulated connection between the base plate 8 and the frame 51 is made, for example, by means of two quadrilateral articulated systems, including two pairs of articulated side levers 9, 10 (see also FIG. 3) connected in an articulated manner to the base plate 8, on each side thereof, around articulation axes 11, 12 parallel and spaced apart which, in the assembled condition of the assembly of seats on the motor-vehicle, are oriented transversely with respect to the longitudinal direction of the motor-vehicle. Each of the side levers 9, 10 has its opposite end pivotally connected to the frame 51 around a respective articulation axis.

It should be noted that the configuration of the articulated connection system between the base plate 8 and the frame of the backrest of the assembly of seats 2 is illustrated here purely by way of example, this articulated connection may, in fact, be made in any other known way.

As a result of the articulated connection described above, the base plate 8 can be moved between a substantially vertical raised inoperative position, and a lowered operating position wherein the base plate 8 projects horizontally and cantilevered from the front surface of the backrest.

In the example, in its inoperative position, the table unit 1 is received within an opening 70 formed in the padded body of the backrest 7.

The arrangement is such that—in the aforesaid operative position—the base plate 8 is spaced apart from the cushion 6 of the assembly of seats. Therefore, the quadrilateral articulated connection between each side of the base plate 8 and the frame 51 is configured in such a way as to ensure that the base plate 8 remains in a stable horizontal position even in the presence of a load on the table. In the specific embodiment illustrated, the quadrilateral articulation system on each side of the base plate 8 envisages that the lever 9, which is articulated to the articulation axis 11 that is located further forward, is connected to the frame 51 at a point located higher with respect to the point of the frame to which the lever 10 is connected, which is articulated to the other articulation axis 12.

With reference to FIG. 6, a pivoting table 13 is mounted above the base plate 8. According to a fundamental characteristic of the present invention, the table 13 is capable of rotating with respect to the base plate 8 around any one of two articulation axes AR, AL which—in the illustrated example—are defined by two articulation pins PR, PL (see also FIG. 4) carried by the base plate 8 and mounted within holes 14 (FIG. 6) of the base plate 8.

The two articulation axes AR, AL are orthogonal to the plane of the base plate 8, so that in the operating condition of the base plate 8 (illustrated in FIG. 4) they are oriented vertically. In the illustrated embodiment example, the articulation axes AR, AL are symmetrically arranged at the two sides of, and at a distance from, a centerline X-X (FIG. 6) of the base plate 8, and are contained in a plane orthogonal to the vertical median plane of the base plate 8.

The pivoting table 13 consists of a plate, for example, of metallic material, above which two latching devices are arranged (see in particular FIG. 5) intended to cooperate with the two right and left articulation pins PR, PL. In the illustrated example, the rear edge of the plate constituting the pivoting table 13 has two recesses 13A. When the base plate 8 is in its lowered operating position, and the pivoting table 13 is in its non-rotated position, the right and left articulation pins PR, PL protrude above the recesses 13A, so that they can be engaged by the two latching devices 15.

As will be illustrated in detail below, a respective release button is associated with each latching device 15, in such a way that actuation of one of the two release buttons enables the pivoting table 13 to rotate around the articulation pin that is associated with the latching device that is still locked.

Figure 5:
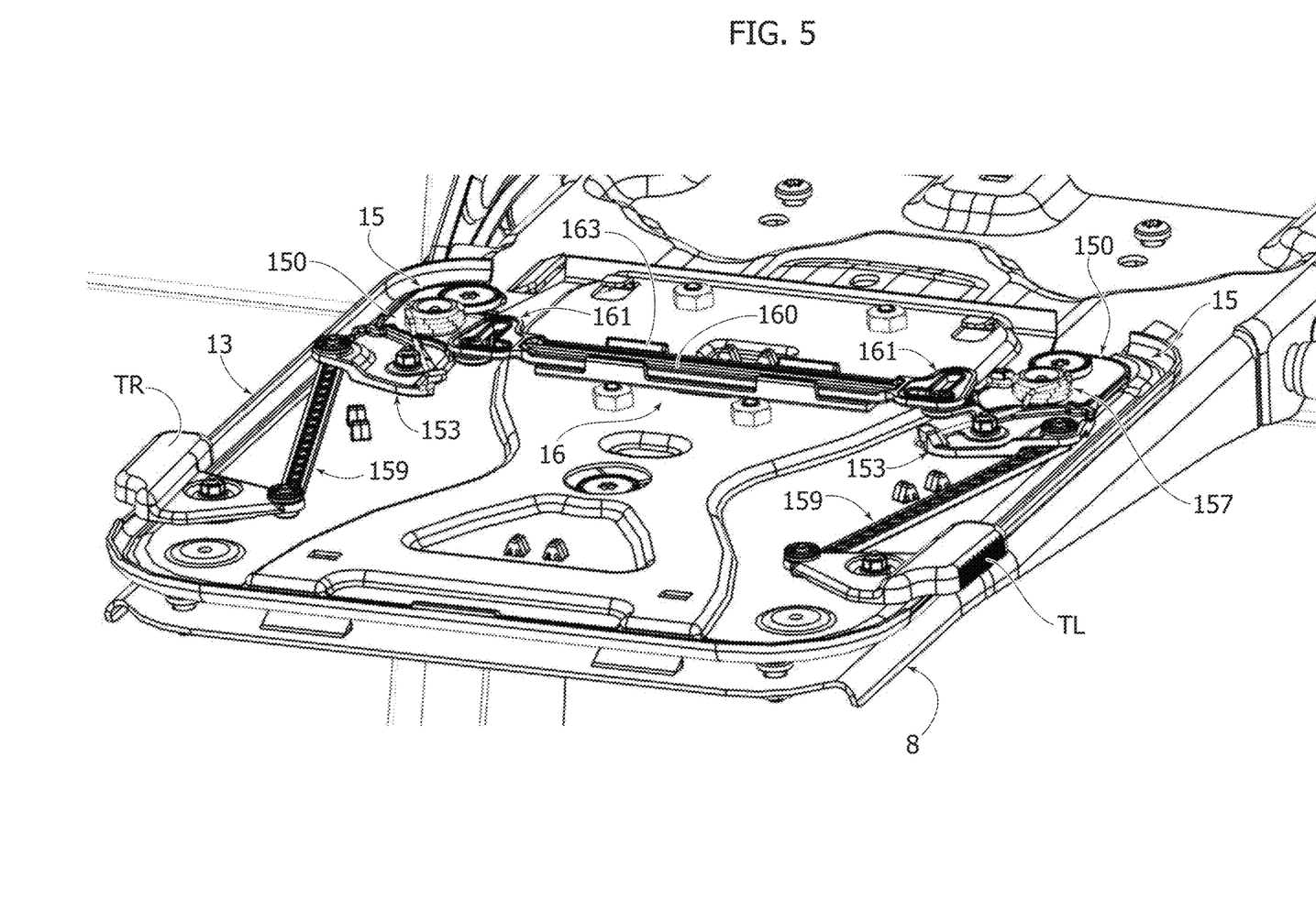
FIG. 5 is a perspective view of the table unit in its operative position, with the upper covering plane removed.

With reference in particular to FIG. 5, in the embodiment example, the two release buttons are indicated with the references TR, TL, and are arranged on the two sides of the pivoting table 13, in order to release, respectively, the two latching devices 15 located at the left and right of the table 13.

An embodiment example of the latching devices 15 is described below with reference to FIGS. 9-12. Each latching device 15 comprises a hooking lever 150, which is pivotally mounted on the pivoting table 13 around an axis 151, and which has a hooking portion 152 (see in particular FIGS. 11, 12), configured to partially surround the respective articulation pin PR or PL. Each latching device 15 further comprises a locking lever 153 pivotally mounted on the pivoting table 13 around an axis 154 and having a locking position (see FIG. 12) wherein it engages the hooking lever 150 so as to lock it in an engagement position of the respective articulation pin. In the specific illustrated example, the locking lever 153 has a recess 155 configured to engage a projection 156 of the hooking lever 150 in order to lock it in the engagement position of the pin.

A spring 157 is operationally interposed between the hooking lever 150 and the locking lever 153 (better visible in FIGS. 11 and 12), formed, in the example illustrated, of a metal wire wound around the articulation pin of the hooking lever 150, and having end arms connected, respectively, to the hooking lever 150 and to the locking lever 153. The spring 157 is configured and arranged in such a way as to tend to rotate the hooking lever 15 away from its engagement position of the articulation pin. At the same time, the spring 157 tends to keep the locking lever 153 in its locking position.

Finally, each hooking device 15 comprises a connection transmission between the locking lever 153 and the respective release button TR or TL. In the illustrated example, each release button TR, TL is in the form of a lever pivotally mounted on the table 13 around an axis 158, and has an end portion, opposite to the end portion which acts as a button, which is connected to the locking lever 153 by means of a transmission constituted, in the example illustrated, by a tie rod 159 in the form of a rod of plastic material. Again in the specific illustrated example, the rod 159 has a body in the form of a bar having a series of lightening holes. The articulation axes of the hooking lever 150, of the locking lever 153 and of the lever constituting the actuation button TR or TL are all parallel to each other and orthogonal to the general plane of the pivoting table 13.

Figure 9:
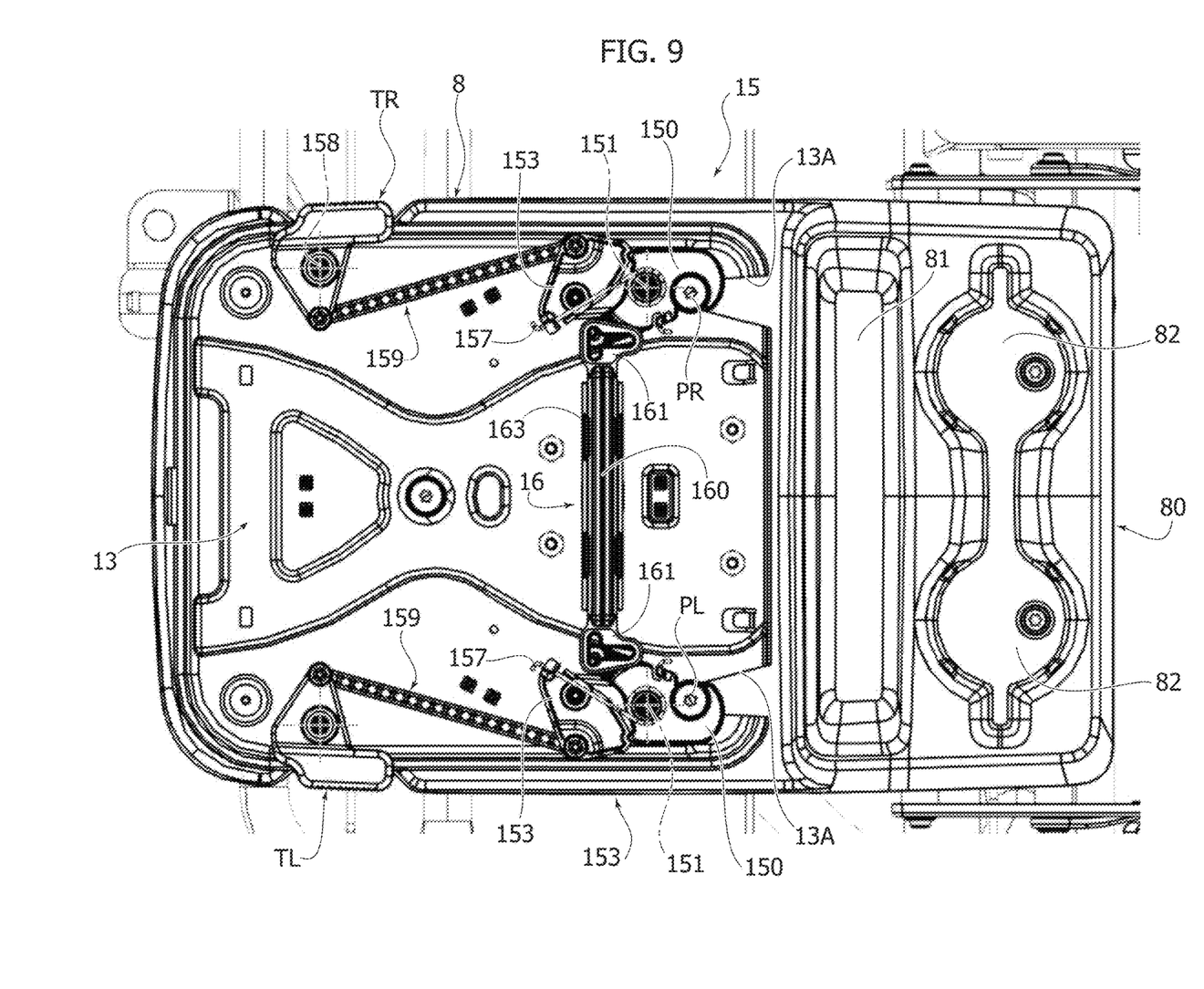
FIG. 9 is a plan view of the table unit, with the upper plane cover removed, so as to illustrate the components mounted above the pivoting table.
Figure 10:
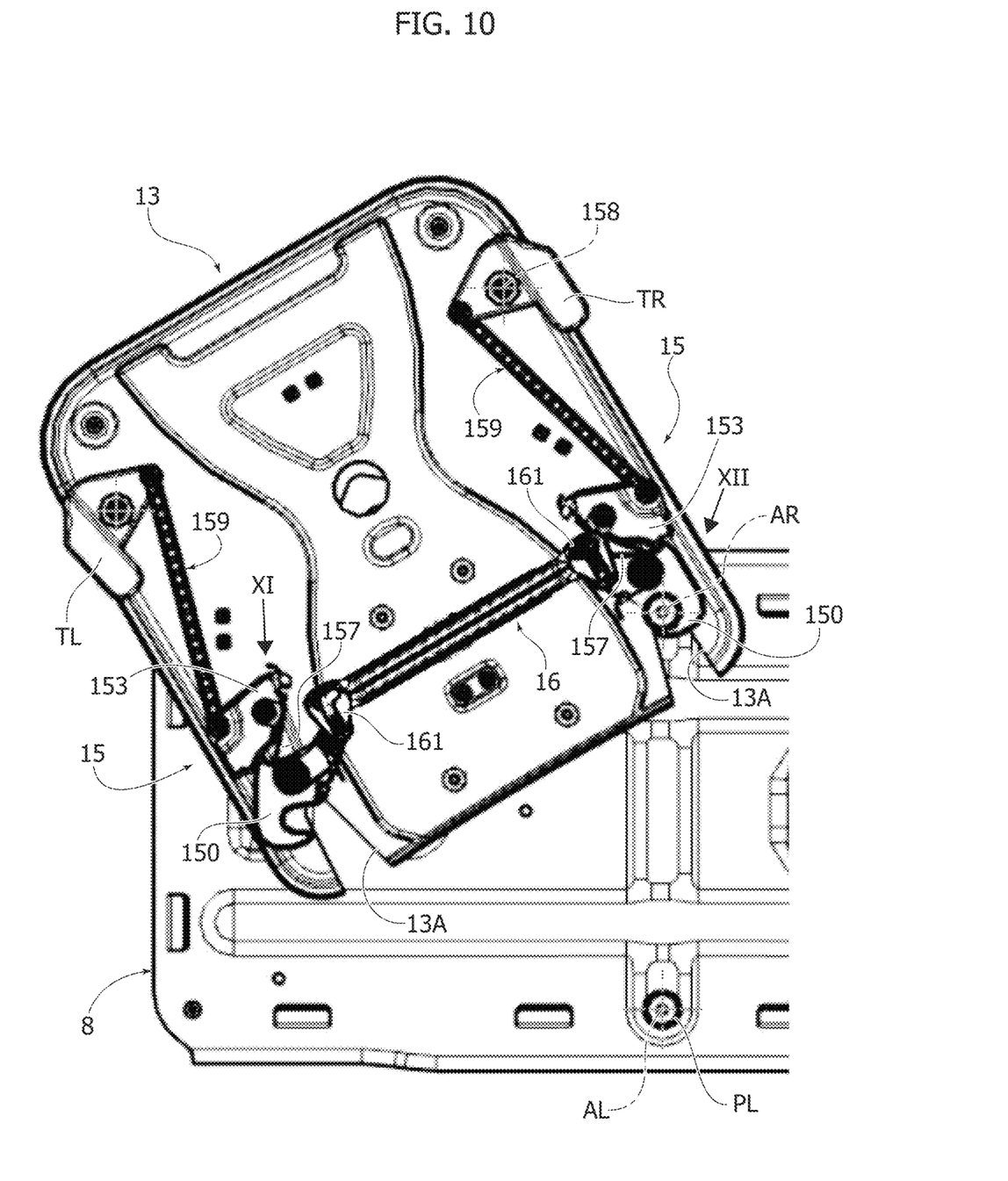
FIG. 10 shows the pivoting table of FIG. 9 in the condition rotated around the right articulation pin.

As already indicated above, FIG. 9 illustrates the pivoting table in the non-rotated position, while FIG. 10 shows the pivoting table in a position rotated towards the right. As already indicated, as a result of the arrangement described above, the pivoting table 13 is capable of rotating with respect to the base plate 8 around either the right or left articulation pins PR, PL. By releasing the left latching device 15, as in the case illustrated in FIG. 10, the pivoting table 13 may be rotated to the right, around the right articulation axis AR defined by the right articulation pin PR, so as to serve a user seated to the right of the table unit. Conversely, by releasing the right latching device 15, the pivoting table 13 can be rotated to the left, around the left articulation axis AL defined by the left articulation pin PL, so as to serve a user seated on the left of the table unit.

FIG. 3 of the attached drawings shows the table unit in its operative condition, with the base plate 8 in its lowered operative position and with the pivoting table 13 in its non-rotated position. FIG. 3 illustrates the upper cover panel 113 of the pivoting table 13, arranged above the mechanisms constituting the two latching devices 15.

As can be seen in FIG. 3, in the case of the specific example illustrated, a body 80 defining storage compartments and bottle holders 81, 82 is associated with the end portion of the base plate 8 located behind the pivoting table 13. As can be seen in FIG. 3, the body 80 has a front surface immediately adjacent to the rear edge of the pivoting table 13, so that when the left latching device is released, the pivoting table can rotate around the right articulation axis only towards the right, while when the right latching device is released, the pivoting table 13 can rotate around the left articulation axis only towards the left.

Again with reference to FIGS. 9-12, a connecting device 16 is operationally interposed between the two latching devices 15, configured in such a way that when one of the two latching devices is released, by acting on the respective actuation button, the other latching device remains locked, even if the respective activation button is pressed.

Figure 11:
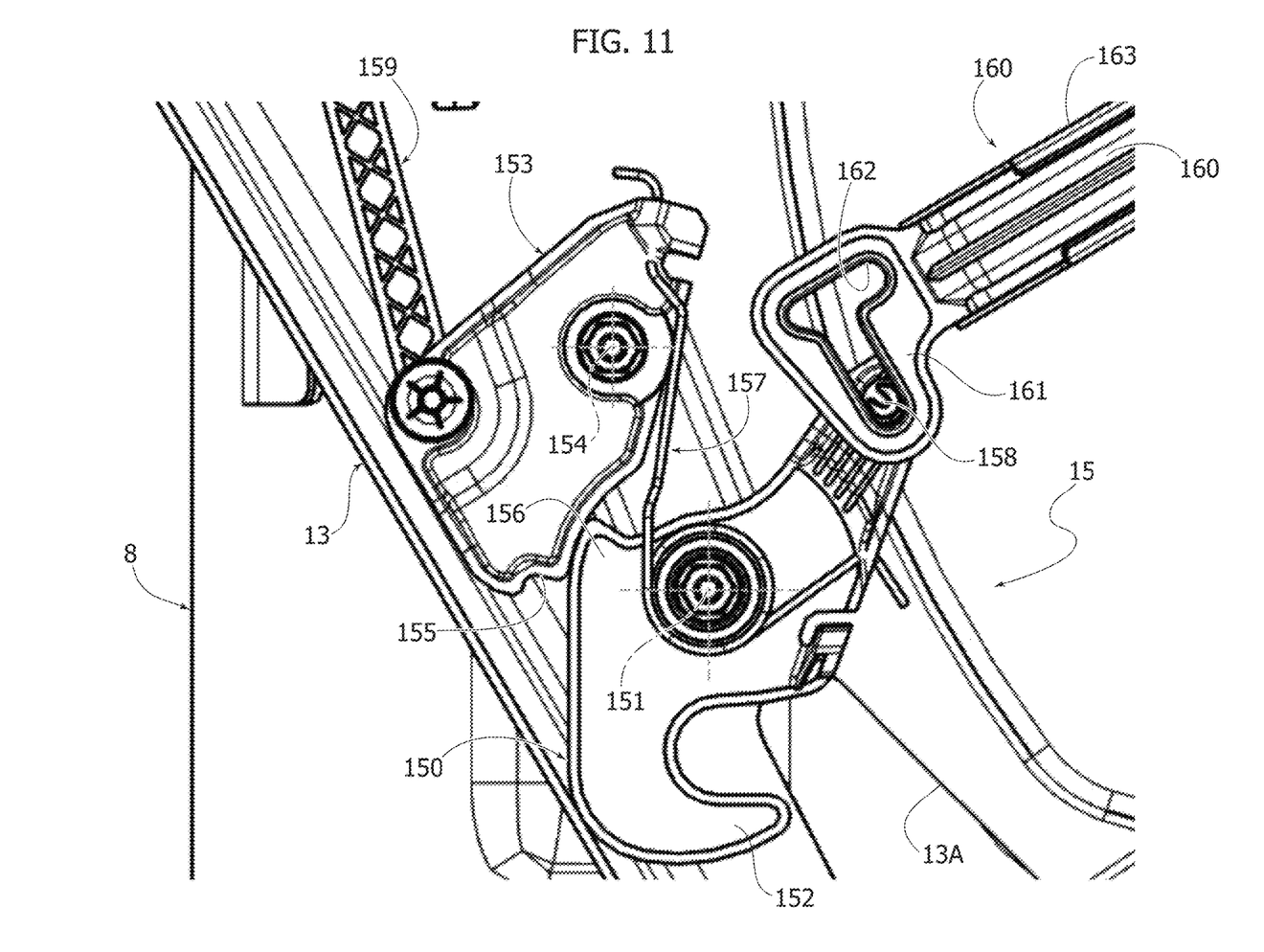
FIGS. 11, 12 are enlarged scale views of the details indicated with arrows XI and XII in FIG. 10.
Figure 12:
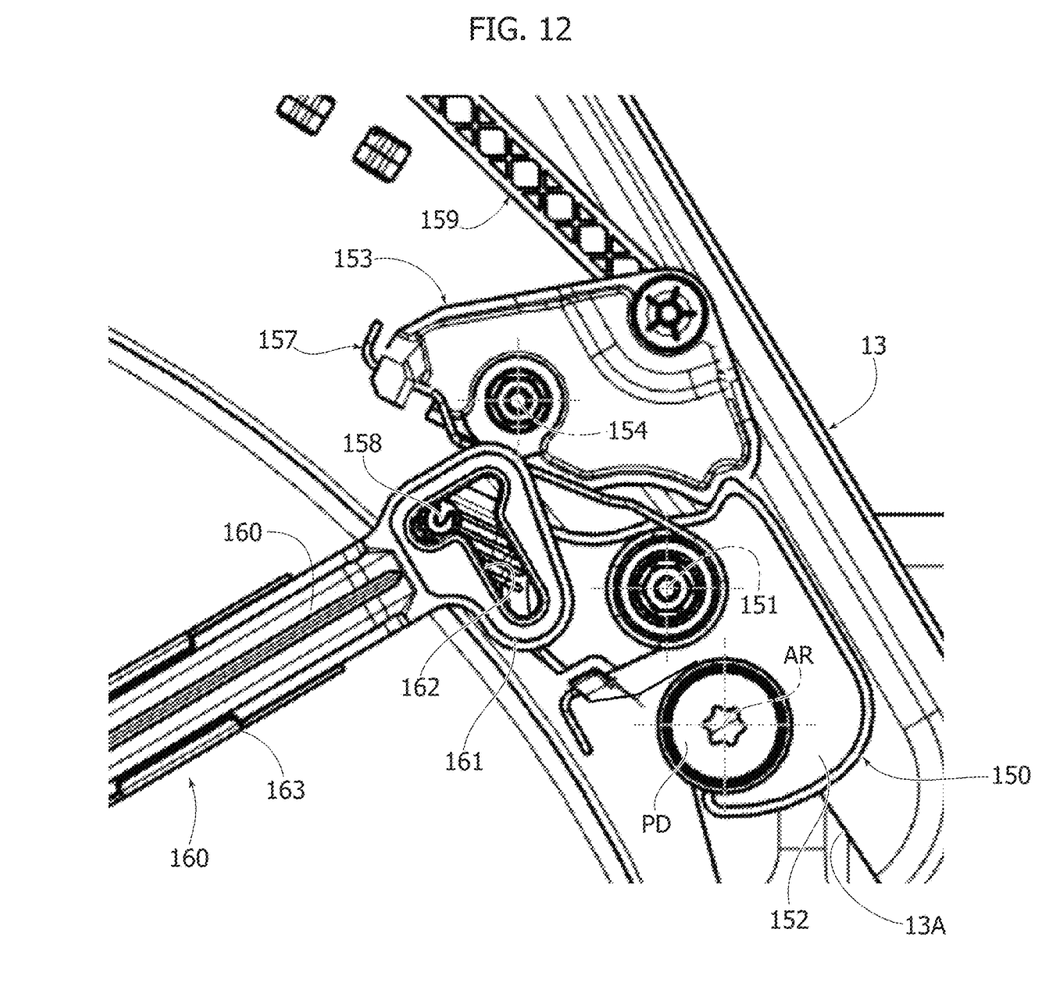

In the case of the specific illustrated example, the connecting device 16 includes a rod 160 slidably mounted in a guide 163 (FIGS. 5, 6) fixed to the table 13, and having two end portions 161 (see FIGS. 11, 12). Each end portion 161 has a guide slot 162 wherein an auxiliary pin 158 is engaged.

In the illustrated example, each guide slot 162 has a general T-shaped configuration, with a T-head and a T-stem. The two ends of the T-head and the distal end of the T-stem define, respectively, a first, a second and third stroke-end position for the movement of the auxiliary pin 158 relative to the respective guide slot 162 (in fact, it is the slot 162 that can be moved with respect to the pin 158). As can be seen in FIG. 9, when both the latching devices are locked, the auxiliary pins 158 carried by the hooking levers 150 are both in the first stroke-end positions within the respective slots 162. With reference to FIG. 11, when a latching device 15 is unlocked, the auxiliary pin 158 moves, with respect to the guide slot 162, to the third stroke-end position within the guide slot 162. At the same time, following the movement imparted to the connecting rod 160 by the hooking lever 150, when the latter is unlocked, at the other end of the connecting rod 160, the auxiliary pin 158 of the lever 150 (which has remained locked) moves, relative to the guide slot 162, to its second stroke-end position (see FIG. 12). In this condition, the wall of the slot 162 prevents any movement of the auxiliary pin 158 corresponding to a rotation of the hooking lever 150. This means that once a hooking lever 15 has been released (in the example of FIGS. 9-12, the left hooking lever), the hooking lever that has remained locked (in the example, the right hooking lever) can no longer be unlocked, not even by acting on the respective activation button.

Thanks to the aforesaid characteristic, the user is prevented from unlocking both latching devices, which could entail, under certain extreme conditions, the possibility of a decoupling of the pivoting table 13 with respect to the base plate 8.

Figure 7:
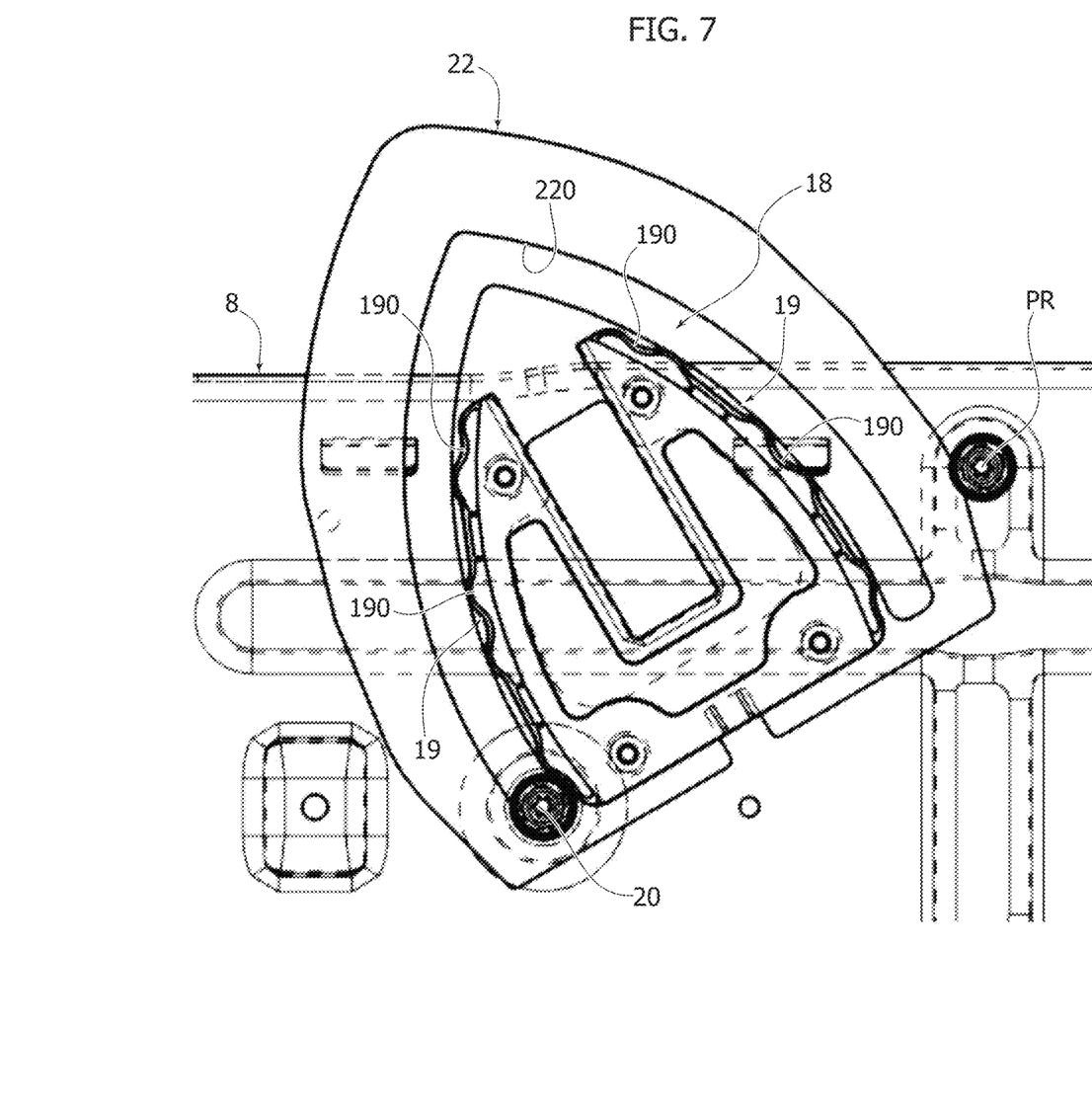
FIG. 7 is a plan view illustrating the positioning member and the guide plate arranged below the pivoting table of the table unit, illustrated in a position corresponding to a rotated condition of the pivoting table.
Figure 8:
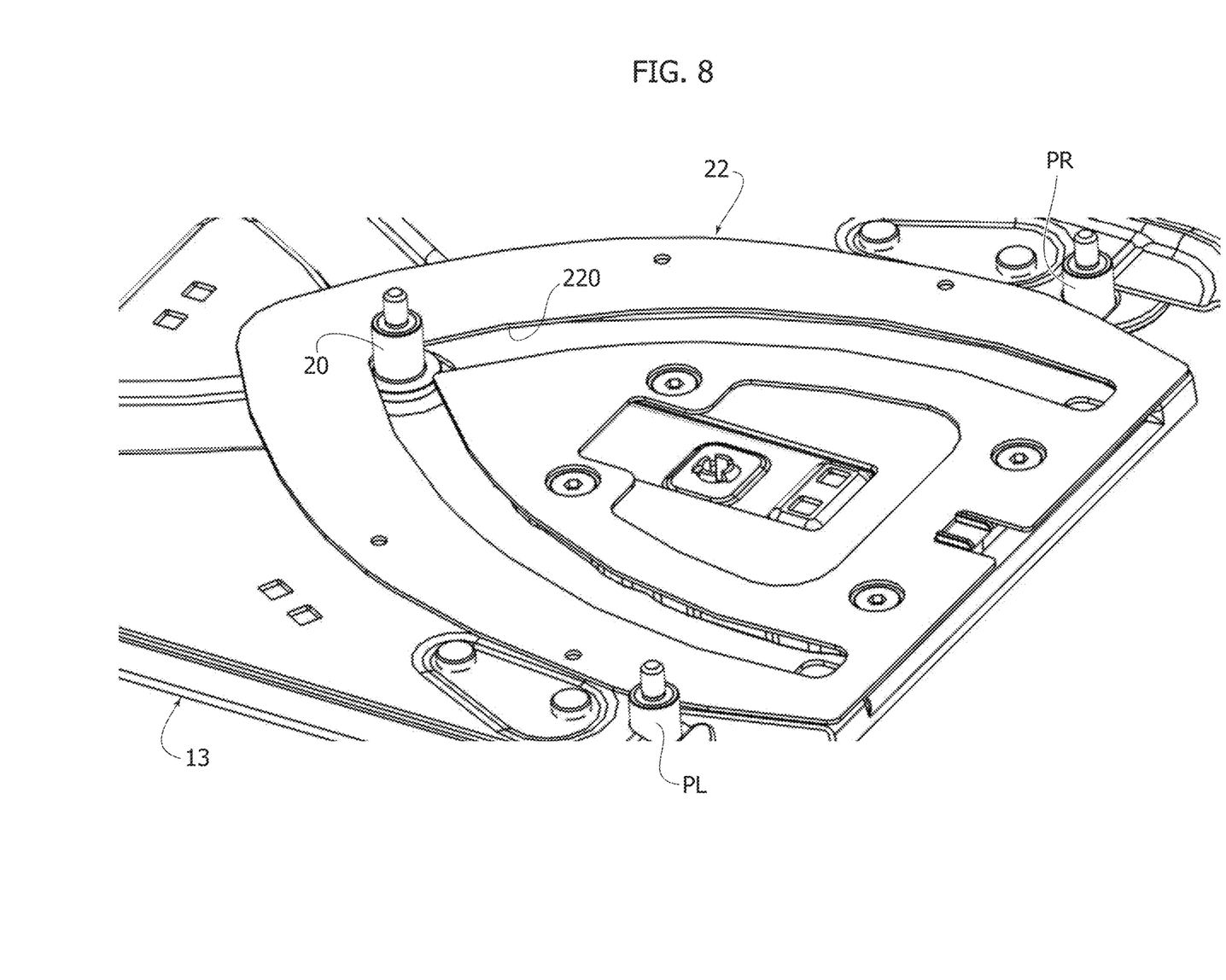
FIG. 8 is a perspective view of the guide plate, illustrated in the position corresponding to the non-rotated condition of the pivoting table.

With reference to FIGS. 6-8, the preferred example of embodiment of the table unit according to the invention also includes a positioning member 18 configured to define several stable positions of the pivoting table 13, corresponding to different rotation angles with respect to the base plate 8. With reference to FIGS. 6 and 7, in the specific illustrated example, the positioning member 18 is in the form of a plate with a general fork-like configuration with two convex curved sides. Associated with each of the two sides of the plate 18 is an elastic track formed by a corrugated sheet 14 which defines a plurality of positioning cavities 190. When the pivoting table 13 is rotated, the positioning member 18, which is secured to the pivoting table 13 below it rotates relative to the base plate 8 in such a way that one of the two peripheral tracks 19 slides against a fixed central pin 20 within a hole 21 of the base plate 8 (see FIG. 6). The selective engagement of the central pin 20 within one of the reference cavities 190 defines a plurality of stable positions of the pivoting table, rotated by different angles. In the preferred embodiment example, the maximum rotation angle of the pivoting table, to the right (around the right articulation axis) (AR) or to the left (around the left articulation axis) (AL), is 60°, and two intermediate positions are also provided between this position of maximum rotation and the non-rotated position. Of course, the provision of one or more intermediate positions is entirely optional.

With reference again to FIGS. 6-8, the preferred embodiment of the table unit according to the invention further comprises a guide plate 22, which in the illustrated example has a shield configuration, with a guide slot 220 having a pointed-arch configuration, through which the central pin 20 protrudes, carried by the base plate 8 (see FIG. 7). The guide plate 22 is mounted on the pivoting table 13 below the pivoting table 13 and below the positioning member 18. Therefore, the central pin 21 of the base plate 8, protruding through the guide slot 220, is able to engage the sides of the positioning member 18, but does not interfere with the rotation of the pivoting table 13. At the same time, the engagement of the central pin 20 carried by the base plate 8 within the guide slot 220 of the plate 22 ensures that the pivoting table 13 remains stably in a horizontal position, even when it is rotated, and protrudes laterally in a cantilevered manner from the base plate, also when a weight is applied on it.

As is evident from the above description, the table unit according to the invention is characterized above all by the fact of having a pivoting table that can be selectively rotated around any one of two articulation axes. In the preferred embodiment, the two articulation axes are arranged symmetrically at the two sides of the centerline of the table unit. Thanks to this characteristic, the table unit according to the invention may be advantageously used to serve both a user seated to the right of the seat with which the table unit is associated, and a user seated to the left of the seat with which the table unit is associated. In both cases, the rotation takes place around an articulation axis which is laterally displaced towards the user, with respect to the centerline of the table unit, which allows the pivoting table to be brought into a position that allows greater ease of use by the user.

At the same time, the aforesaid functional advantages are obtained with a relatively simple, reliable and safe structure. In particular, adoption of the connecting device between the two latching devices associated with the left and right articulation pins is particularly advantageous, for preventing, after having released one of the two latching devices, the other latching device from becoming unlocked. Another advantageous feature of the invention resides in the provision of the positioning member which cooperates with the central pin of the base plate, to allow the pivoting table to be arranged in several stable positions, rotated by different angles, starting from the non-rotated position up to the position of maximum rotation, to the right or to the left. Preferably, the guide plate described above is also provided, fixed under the positioning member and having a guide slot for the central pin that cooperates with the positioning member.

When the table unit is not required, it can be raised to its inoperative position, wherein it is received within the padded body of the seat backrest, so that the seat with which the table unit is associated can be occupied. As can be seen in FIG. 2, a padded covering panel 83 (FIG. 2) is associated with the base plate 8, which defines a portion of the surface of the backrest when the table unit is in its inoperative position.

Of course, without prejudice to the principle of the invention, the details of construction and the embodiments may vary widely with respect to those described and illustrated purely by way of example, without departing from the scope of the present invention.

What is claimed is:

1. A table unit for a motor-vehicle seat, comprising:
   a base plate, configured for articulated connection to a support frame, in such a way as to be movable between an inoperative position, adjacent to a front surface of a seat backrest and an operative position, projecting horizontally in a cantilevered manner from said front surface of the seat backrest;
   a table pivotally mounted on the baseplate;
   the pivoting table configured to selectively rotate with respect to the base plate around any one of two parallel and spaced apart articulation axes;
   the two articulation axes defined by two articulation pins carried by the base plate and arranged symmetrically on both sides of, and at a distance from, a longitudinal centerline of the base plate;
   the base plate provided with two latching devices, arranged, respectively, for engaging said two articulation pins, and having respective release buttons, in such a way that actuation of one of the release buttons enables the pivoting table to be rotated around the articulation pin that is associated with the latching device that is still locked; and
   wherein the two latching devices are operatively connected to each other by means of a connecting device configured in such a way that if one of the two latching devices is unlocked, said connecting device prevents unlocking of the other latching device.

2. A table unit according to claim 1, wherein each latching device comprises:
   a hooking lever pivotally mounted on the base plate and having a hooking portion configured to partially surround the respective articulation pin,
   a locking lever, pivotally mounted on the base plate and having a locking position, wherein the locking lever engages the hooking lever so as to lock the hooking lever in a position of engagement of the respective articulation pin,
   a spring operatively interposed between the locking lever and the hooking lever, which tends to rotate the hooking lever away from the position of engagement of the articulation pin, and which tends to keep the locking lever in the locking position, and
   a connecting transmission between the locking lever and the respective release button configured in such a way that the actuation of the release button causes a movement of the locking lever away from the locking position, against the action of said spring and a resulting rotation of the hooking lever away from the position of engagement, due to the action of said spring.

3. A table unit according to claim 1, wherein the two release buttons are arranged on the two sides of the pivoting table.

4. A table unit according to claim 2, wherein said connecting device between the two latching devices comprises a rod having end portions with respective guide slots wherein respective auxiliary pins are engaged, which are carried by the hooking levers of said latching devices, each guide slot being configured in such a way that each guide slot prevents the movement of the respective hooking lever when the other hooking lever is unlocked.

5. A table unit according to claim 4, wherein each guide slot of said connecting device has a T-shape, with a T-head and a T-stem, so as to define a first and a second stroke-end position for the auxiliary pin relative to the guide slot, corresponding to the two ends of the T-head, and a third stroke-end position corresponding to the distal end of the T stem,
   in such a way that:
      when both hooking levers are locked, the respective auxiliary pins are both in their first stroke-end positions, while
      when one hooking lever is unlocked, the respective auxiliary pin moves, relative to the guide slot, to the third stroke-end position, while the auxiliary pin of the hooking lever which has remained locked, moves to the second stroke-end position, wherein the auxiliary pin prevents rotation of the respective hooking lever.

6. A table unit according to claim 1, wherein a positioning member is secured underneath the pivoting table, the positioning member having a peripheral elastic track configured to slide against a central pin of said base plate during the rotation of the pivoting table with respect to the base plate, said elastic track being configured to define several stable positions of the pivoting table, corresponding to different rotation angles with respect to the base plate.

7. A table unit according to claim 6, further comprising a guide plate secured to the pivoting table, below the pivoting table and below said positioning member and having a guiding slot which is engaged by said central pin.

8. A motor-vehicle seat, comprising a table unit according to claim 1.

9. A motor-vehicle, comprising a seat according to claim 8.

* * * * *